(12) United States Patent
Scott

(10) Patent No.: US 6,339,481 B1
(45) Date of Patent: Jan. 15, 2002

(54) REAL-TIME FACSIMILE TRANSMISSION OVER DIGITAL NETWORKS

(75) Inventor: Jeffrey A. Scott, Germantown, MD (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/031,047

(22) Filed: Feb. 26, 1998

Related U.S. Application Data

(60) Provisional application No. 60/039,513, filed on Mar. 3, 1997.

(51) Int. Cl.[7] ................................................. H04N 1/32
(52) U.S. Cl. ...................... 358/442; 358/407; 358/434; 358/468
(58) Field of Search ............................... 358/407, 434, 358/442, 468, 404, 405, 409, 411, 435, 436, 437; 379/100, 100.09, 100.17, 100.01

(56) References Cited

U.S. PATENT DOCUMENTS

| 4,661,857 A | | 4/1987 | Kondo ........................ 358/257 |
|---|---|---|---|
| 5,189,525 A | | 2/1993 | Kontani ...................... 358/407 |
| 5,282,238 A | | 1/1994 | Berland ........................ 379/58 |
| 5,299,024 A | * | 3/1994 | Kafri ........................... 358/400 |
| 5,369,501 A | | 11/1994 | Wilson et al. ............... 358/407 |
| 5,418,624 A | | 5/1995 | Ahmed ........................ 358/435 |
| 5,463,477 A | | 10/1995 | Kakizaki ..................... 358/431 |
| 5,509,050 A | * | 4/1996 | Berland ........................ 379/58 |
| 5,515,177 A | | 5/1996 | Propach et al. ............. 358/426 |
| 5,517,323 A | | 5/1996 | Propach et al. ............. 358/109 |
| 5,539,531 A | | 7/1996 | Propach et al. ............. 358/426 |
| 5,546,388 A | | 8/1996 | Lin ............................. 370/60 |
| 5,566,000 A | | 10/1996 | Propach et al. ............. 358/412 |
| 5,587,810 A | * | 12/1996 | Feldman ..................... 358/442 |
| 5,835,579 A | * | 11/1998 | Gersi et al. ............. 379/100.17 |
| 5,877,871 A | * | 3/1999 | Smith et al. ................ 358/442 |
| 5,883,723 A | * | 3/1999 | Sakata ........................ 358/442 |

FOREIGN PATENT DOCUMENTS

EP        WO 97/10668     *  3/1997

* cited by examiner

*Primary Examiner*—Mark Wallerson
(74) *Attorney, Agent, or Firm*—Frederick J. Telecky, Jr.; Wade James Brady, III; Warren L. Franz

(57) ABSTRACT

Providing facsimile communications in a system wherein an originating facsimile terminal equipment (FTE) connects to an intermediate digital network of unknown and unpredictable delay via an originating facsimile interface unit (FIU) and wherein a destination FTE connects to the network via a destination FIU. The originating FTE sends data to the destination FTE via the originating FIU. The originating FIU sends the data to the destination FIU. While the destination FIU is waiting for data from the originating FTE, the destination FIU sends made-up data to the destination FTE to prevent protocol timeouts of the destination FTE. The FTEs operate under the G3 protocol. The made up data is either fill data or stall data, depending on the amount of data accumulated at the destination FIU and on the types of network delays.

28 Claims, 6 Drawing Sheets

REAL-TIME FACSIMILE TRANSMISSION OVER DIGITAL NETWORKS

This application claims priority from U.S. Provisional Appl. No. 60/039,513 filed Mar. 3, 1997.

FIELD OF THE INVENTION

This invention relates to facsimile transfer over digital networks, and, more particularly, to the transfer of facsimiles over digital networks in real-time, dealing with delays caused by the networks.

BACKGROUND OF THE INVENTION

Various protocols exist for transmission and receipt of facsimiles over low-delay analog voice-grade telephone lines. One such protocol is Group 3 (G3), defined in T.30 ("Recommendation T30 (07/96)—Procedures for document facsimile transmission in the general switched telephone network"), which is hereby incorporated herein by reference. T.30 is an International Telecommunication Union (ITU) recommendation dealing with facsimile transfer over a telephone network. This recommendation defines three different protocols for facsimile transfer known as Group 1 (GI), Group 2 (G2), Group 3 (G3). Only the Group 3 protocol is in common use today.

While the G3 protocol is defined for analog transmission, the backbone network for modern telephone systems is generally digital. Accordingly, G3 facsimile is often carried over a digital telephone network using recommendations specified in ITU G.766, which is hereby incorporated herein by reference. The ITU G.766 recommendation describes how analog signals are demodulated, forwarded over the network and remodulated at the remote end of the call.

In addition to being used with the PSTN (Public Switched Telephone Network), G3 facsimile is also used over satellite and other digital networks. Even in non-PSTN networks, the techniques described in G.766 can generally be used, although they must be modified appropriately to suit the characteristics of the network.

The Protocol Analysis (PA) technique described in G.766 is widely used in non-PSTN networks. This technique requires that the Facsimile Interface Unit (FIU, i.e., the hardware/software component of a network that provides an interface between a compatible facsimile machine and a network) follow the G3 facsimile protocol so it can use the correct voiceband modems to demodulate signals from and remodulate signals to the G3 facsimile machine.

Various problems exist when trying to use G3 facsimile over digital networks, the main problem being the additional delay added to the connection by the nature of the digital network. For example, if a satellite link is used in the digital network, this adds approximately 250 ms of delay in both directions of signal travel.

A call through a digital network between two widely separated geographic locations may pass through several network components that introduce additional delay as compared to a direct analog connection between two facsimile machines. The delay problem becomes more acute when G3 facsimile is sent over a packet-switched network. Typically, these networks have no upper bound on delay. Further, the delay between any two packets is not predictable due to various network events. Unlike a modern PSTN, data passing through a packet network experiences variable and unpredictable delays.

The G3 facsimile protocol was designed for low-delay analog telephone connections and it contains no explicit ways to tell a facsimile machine to wait longer than some time period for protocol interactions to occur. The G3 facsimile protocol specifies several timers which may expire (timeout) if the delay is high. The most-used timer is one used for commands and responses. When an FIU transmits a command, it starts the timer and waits for a response message. If the timer expires, it retransmits the command and starts the timer over again. As soon as the facsimile machine starts receiving a response, it stops the timer. The facsimile machine ends the call after three retransmissions without reply.

In a high-delay situation, the retransmission of the command by the facsimile machine will often occur around the same time that the response to the original command is arriving over the network, resulting in a collision between the second copy of the command (being transmitted by the facsimile machine) and the reply to the first copy of the command arriving over the network. This situation is shown in FIG. 1 wherein timeout occurs without the originating facsimile machine (FTE) receiving a reply from the destination FTE 10-2. The retransmission from the originating FTE 10-1 collides with the reply from the destination FTE 10-2. The response of a facsimile machine to a protocol collision is vendor-specific and not predictable, and often results in failure to transfer a document.

ITU recommendation G.766 specifies one technique for handling delay situations and this is that the FIU will start to send so-called "fill data" which is formatted to look like the normal preamble signal before a valid message. This fill data is sent to the FTE if a reply to a command has not arrived after several seconds but before a protocol timeout (triggering a retransmission) will occur at the FTE. FIG. 2 shows an example of the use of fill data. As shown in FIG. 2, the originating FTE 10-1 starts a timer at the end of its transmission. Then, before the timeout period expires, the FIU 14-1 starts sending preamble fill signals to the originating FTE 10-1 in anticipation of receiving a message over the network. When the FTE 10-1 starts receiving the fill data, it stops the protocol timer currently in progress. The fill data is sent by the FIU 10-1 in anticipation of receiving a reply to the original command over the network.

This delay compensation technique does not work well in several situations, including, for example:

The response message can be delayed so long that the total length of FIU-generated fill plus the response message exceeds the limits of the G3 facsimile protocol and the FTE thus rejects the message.

The response message does not arrive over the network at all. This could happen for many reasons including that the message was lost in the network or that the original command was corrupted during remodulation to the remote FTE.

The FTE violates the G3 facsimile protocol specification by failing to wait the full, specified timeout period before starting retransmission.

Another problem is variable delay over the network during page data transfer. G3 facsimile uses synchronous voice-band modems and, once transmission starts, a steady supply of page data is required for successful transmission. If the arrival of page data over a network is delayed unpredictably, this will create gaps in the remodulated data stream which will produce corruptions in the printed page image. One solution to this problem could be to increase the amount of buffering at the destination FIU 14-2 so that it can send data from the buffer during periods where no network data is available. There are, however, two problems with this solution:

1. The amount of buffering required is equal to the sum of all instantaneous delays throughout the call. Since these delays are unpredictable, it is impossible to establish an upper limit to the amount of buffering required for any call.
2. Additional buffering of this kind increases delay.

SUMMARY OF THE INVENTION

It is desirable to provide a facsimile system with the following features:

The system can perform document transfer between G3 facsimile equipment over digital networks of unlimited, variable and unpredictable delay.

The system has adaptability on a per-call basis to network connections of different capacity.

The system has interoperability with a broad spectrum of G3 facsimile equipment currently in use.

The system requires no changes to normal PSTN operator procedures for sending G3 facsimile documents.

The system provides little or no disruption to the appearance of the printed document.

Accordingly, this invention provides G3 facsimile through digital networks of high or unpredictable delay. The techniques of this invention are insensitive to delay and still have a high degree of compatibility with the diverse population of G3 facsimile equipment currently in use. There is little or no alteration of the facsimile document as a result of using this invention.

In one general aspect, this invention is a protocol for transferring G3 facsimile over a digital network of unlimited delay. The protocol compensates for an unlimited and unpredictable amount of delay through a digital network.

BRIEF DESCRIPTION OF THE DRAWINGS

The above and other objects and advantages of the invention will be apparent upon consideration of the following detailed description, taken in conjunction with the accompanying drawings, in which the reference characters refer to like parts throughout and in which.

DETAILED DESCRIPTION OF THE PRESENTLY PREFERRED EXEMPLARY EMBODIMENTS

Figure 1:
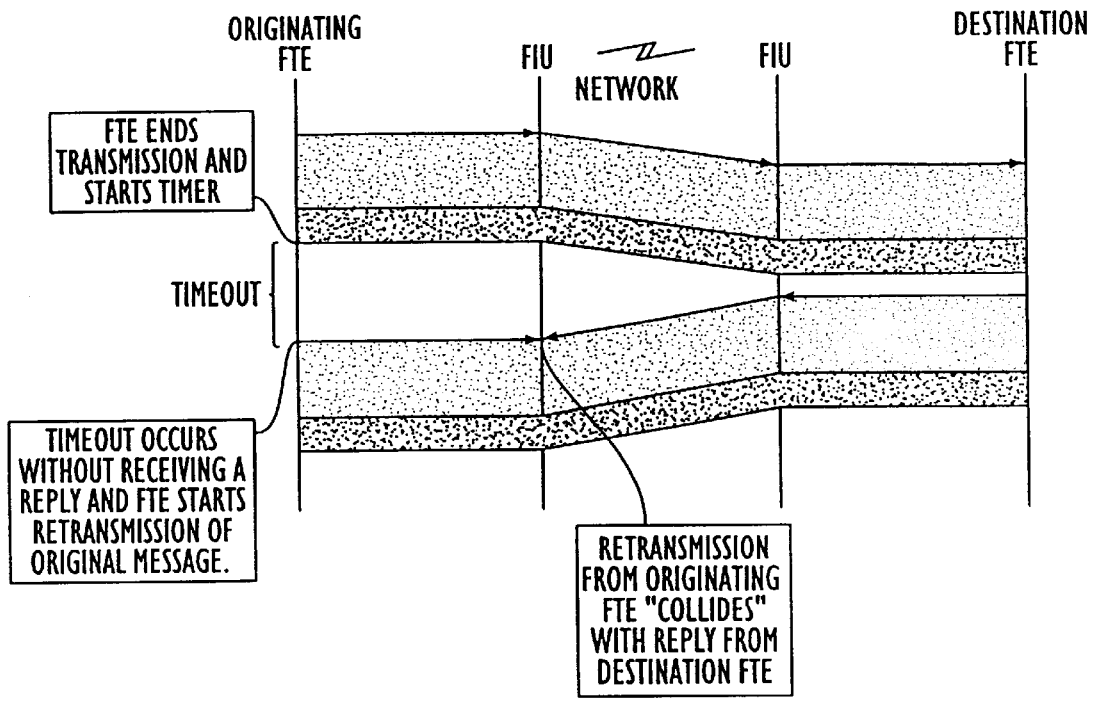
FIG. 1 shows a command/response in a long-delay situation.
Figure 2:
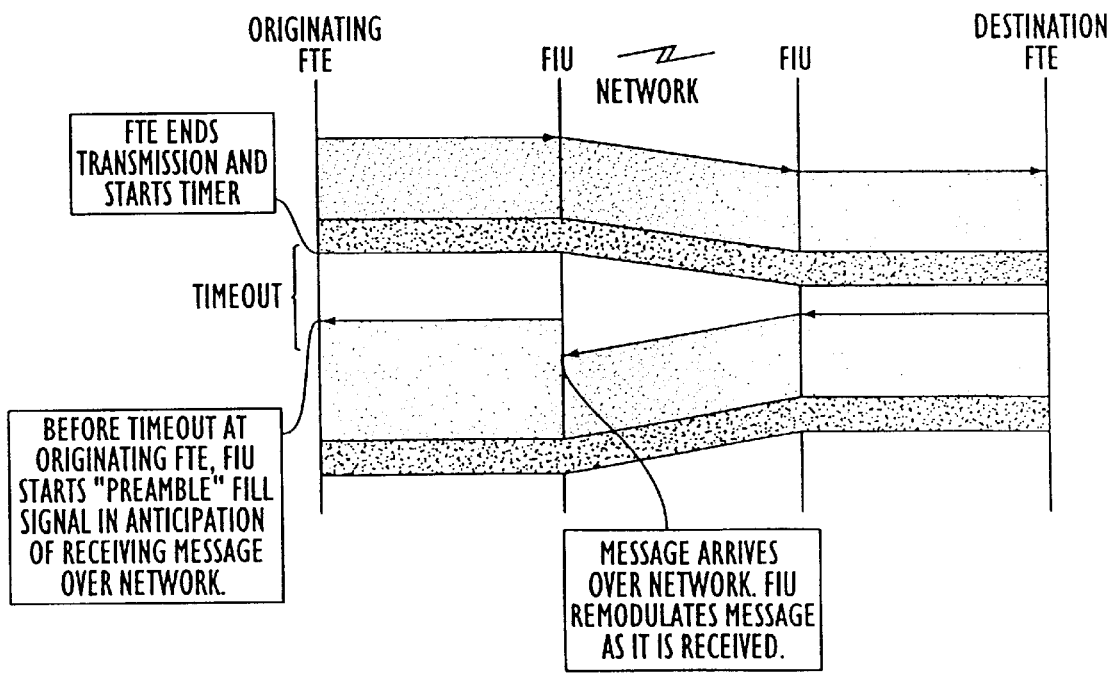
FIG. 2 shows the use of fill data to prevent retransmission.
Figure 3:
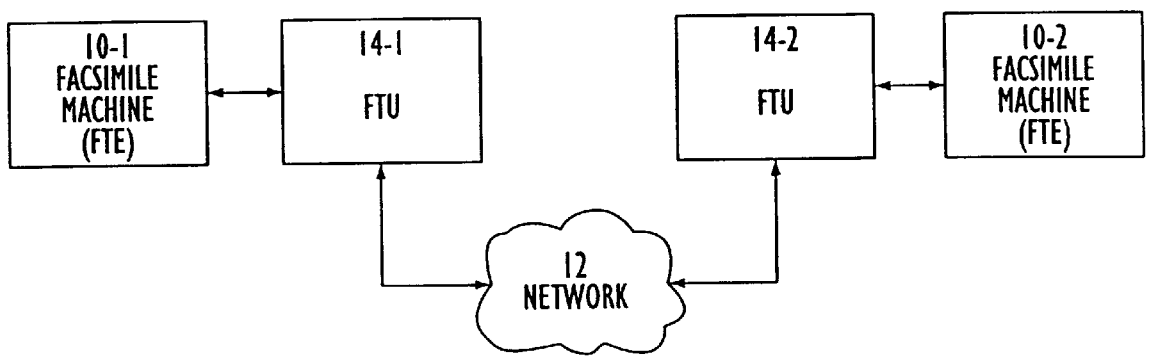
FIG. 3 shows a typical configuration of a facsimile system according to the present invention.

This invention operates in an environment such as shown in FIG. 3 wherein originating facsimile terminal equipment 10-1 connects to a digital network 12 via facsimile interface unit 14-1 (FIU). The FIU 14-1 is the hardware/software component of the network 12 that provides an interface between the FTE 10-1 and the network 12. Also connected to the network 12 are a plurality of other FTEs including FTE 10-2 (connected to the network 12 via FIUs). FTE 10-2 is connected to the network 12 by FIU 14-2. Preferably each FTE is a Group 3-compatible facsimile machine. The digital network 12 is a network 12 such as the Internet or the like.

The functional units associated with the FTE that is transmitting (scanning) a document being transferred are referred to as originating units, e.g., originating FTEs and originating FTUs. Functional units associated with the FTE that is receiving (printing) the document being transferred are referred to as destination units, e.g., destination FTEs and destination FTUs.

In the following description, FTE 10-1 will be considered the originating FTE and FIU 14-1 the originating FIU. FTE 10-2 will be considered the destination FTE and FIU 14-2 the destination FIU.

A facsimile call is made up of five phases (A–E).

In Phase A (Call setup or establishment), the telephone call is placed from the originating FTE to the destination FTE. The call can be made automatically or manually.

In Phase B (pre-message procedure), the destination station (FTE) responds with signals identifying its capabilities. The calling station then sends signals to indicate the mode of operation to be used during the call (e.g., transmission speed, resolution, page size, image coding method etc.) That is, in phase B there is negotiation of optional protocol features and verification of high-speed data transfer capability.

In Phase C (in-message procedure and message transmission) there is procedural signaling and the transmission of the facsimile image. procedural signaling includes, e.g., a modem training sequence from the sending FTE (station) that allows the receiving station to adapt its modem to the telephone line characteristics. If the receiving station (destination FTE) trains successfully and is ready, it responds with confirmation to receive (CFR) signal. Upon receipt of the CFR signal, the sending station sends the facsimile image at the negotiated higher speed. That is, generally, in phase C there is transfer of a page of the document using high-speed modem.

Phase D (post-message procedure) includes signaling for end-of-message, end-of-page transmission and confirmation of page acceptance.

In Phase E the call is terminated.

In phases B, C, and D, the signals are communicated at 300 bps using high-level data link control (HDLC) until a higher speed is negotiated.

During these five phases the following signals are transmitted.

Terminology and Signal Names

The following signals are transmitted using the low-speed (300 bits per second (bps)) V.21 modem:

DIS: Message from the destination FTE specifying the optional G3 features it is capable of supporting.

DCS: Message from the originating FTE specifying the optional G3 features that will be in force for this call.

MPS: Sent by the originating FTE after each page (except the last) of the document.

EOP: Sent by the originating FTE after the last page of the document.

MCF: Response from the destination FTE to an MPS or EOP signal indicating successful reception of the page. After sending this signal, the destination FTE expects to receive page data.

RTP: Response from the destination FTE to an MPS or EOP signal indicating successful reception of the page but retraining of the voice-band modems is necessary.

RTN: Response from the destination FTE to an MPS or EOP signal indicating unsuccessful reception of the page and that retraining of the voice-band modems is required.

NSF: Message from the destination FTE specifying proprietary, vendor-specific or non-T.30 features that it is capable of.

CFR: A response by the destination FTE to the TCF signal indicating that reception of the TCF signal was good. After sending this signal, the destination FTE expects to receive page data.

FTT: A response by the destination FTE to the TCF signal indicating that reception of the TCF signal was bad. After sending this signal, the destination FTE expects to receive the DCS and TCF signals.

The following signals are transmitted using the high-speed (2400–9600 bps) V.27 or V.29 voiceband modem (In other embodiments other speeds and protocols may be used. E.g., rates of up to 14,400 bps and standards such as V.17 and V.29 may be used):

TCF: A signal from the originating FTE to verify that proper reception of page data by the destination FTE is possible. The TCF signal always follows the DCS signal.

Page data: Coded digital representation of the scanned page transmitted by the originating FTE.

The following terminology is used herein

| Training | The process where a DCS/TCF is sent and a CFR or FTT is replied. A good or successful training has a CFR reply and a had or unsuccessful training has an FTT reply. This does not refer to the V-series voice-band modem training process. |
|---|---|
| Bad TCF | A T.30 TCF signal that is constructed by the destination FIU 14-2 so that the destination FTE 10-2 will reply with FTT instead of CFR. |
| DIS Packet | A packet sent over the network 12 from the destination FIU 14-2 containing information from the DIS signal received from the destination FTE 10-2. |
| DCS Packet | A packet sent over the network 12 by either FIU indicating that a successful training has occurred with the adjacent FTE. |
| Page Data Packet | A packet sent over the network 12 by the originating FIU 14-1 containing a portion of page data. |
| MPS Packet | A packet sent over the network 12 by the originating FIU 14-1 signifying end of a page. |
| EOP Packet | A packet sent over the network 12 by the originating FIU 14-1 signifying the end of the last page of the document. |

The following terminology used herein derives from ITU Recommendations T.30 and T.4 which govern Group 3 facsimile.

| FIF | Facsimile Information Field. In the low-speed signals DIS and DCS, the FIF field if the signal contains several octets of information about T.30 capabilities and negotiated optional features. |
|---|---|
| Scan Line | A unit of coded page image data consisting of all image elements along a single horizontal line of the page. |
| Codeword | Image elements within a scan line are described by codewords which represent one or more picture elements along a horizontal scan line. |

| Preamble | At the start of all V.21 transmissions, a sequence of HDLC flag octets. |
|---|---|
| Error Correction Mode (ECM) | A selective-reject protocol defined for Group 3 that allows a destination FTE to request a retransmission of selective parts of page image data that was received in error. |
| Frame Check Sequence (FCS) | In the framed data transmit modes of T.30 (which use HDLC formatted data), each frame is terminated with a bit sequence that is the result of a computation performed on all previous data in the frame. The receiver of a frame performs the same computation on the data it receives and compares its result with the FCS contained in the frame. If they are identical, the frame has been received without error. If they are different, one or more errors are present in received data and the entire frame cannot be trusted. |

Detailed Operational Description

Figure 4:
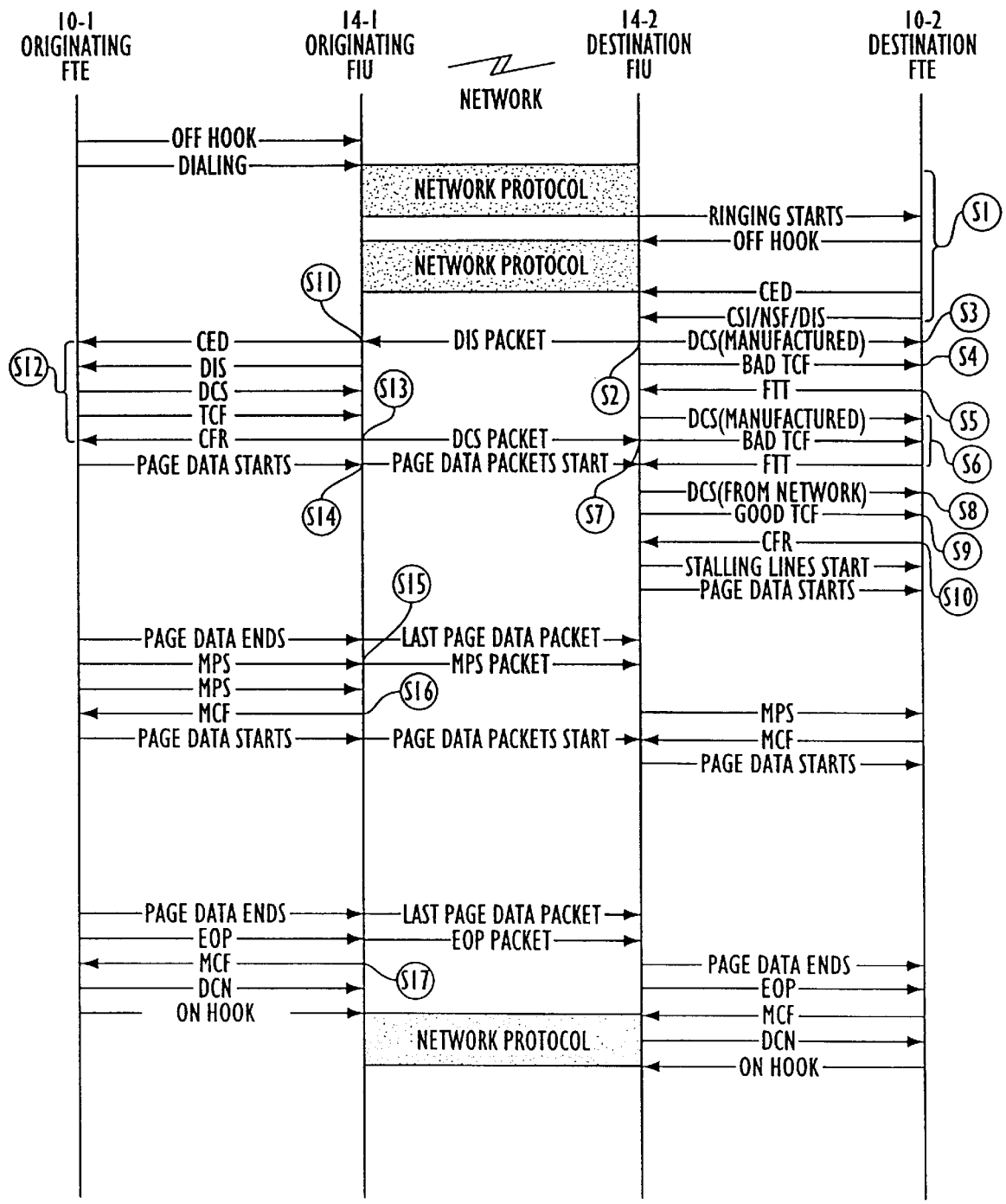
FIG. 4 shows a call using this invention.

With reference now to FIGS. 3 and 4, in order to send a facsimile from originating FTE 10-1 to destination FTE 10-2, the originating FTE 10-1 starts the call normally by dialing the phone number of the destination FTE 10-2. Some protocol through the network 12 takes place whereby a connection is made to the destination FTU 14-2. As the destination FIU 14-2 goes on-line, it is made aware of the maximum allowed data rate through the network 12 in bits-per-second.

Activity at the Destination End of the Call

The destination FIU 14-2 now starts ringing the destination FTE 10-2. The destination FTE 10-2 eventually answers the ringing and sends to the originating FTE 10-1 the normal G3 protocol signals, including the DIS frame (FIG. 4, S4-1). The NSF frame is discarded by the destination FIU 10-2 to prevent negotiation of non-standard modes of operation between the FTEs involved in the call.

Upon receipt of the DIS frame from the destination FTE 10-2, the destination FIU 14-2 edits the contents of the DIS frame. These edits include the following:

The data signaling rate fields are changed to reflect the lower of either the maximum allowed network data rate or the original data signaling rate in the DIS frame from the destination FTE 14-2. This limits future rate negotiations by the originating FIU 14-1 and FTE 10-2 to the maximum data rate defined by the network 12 and the capabilities of the destination FTE 10-2. For example, if the destination FTE 10-2 reports a rate capability of 9,600 bps but the network 12 can only support 5,000 bps, the data signaling rate field will be changed from 9,600 bps to 4,800 bps (where 4,800 bps is the highest G3 rate that is less than 5,000 bps).

The destination FIU 14-2 now sends over the network 12 a DIS packet containing the edited Facsimile Information Field (FIF) fields from the DIS frame received from the destination FTE 10-2 (FIG. 4, S4-2). In the low-speed signals DIS and DCS, the FIF field if the signal contains several octets of information about T.30 capabilities and negotiated optional features.)

At the same time, the destination FIU 14-2 proceeds with the normal G3 protocol phase B in order to prevent protocol timeouts at the destination FTE 10-2. The next step in the G3 protocol is for the destination FIU 14-2 to send a DCS frame to the FTE followed by a TCF signal. However, the DCS packet has not yet arrived from the originating FIU 14-1. The destination FIU 14-2 therefore prevents successful completion of G3 protocol Phase B until the DCS packet arrives over the network 12 from the originating FIU 14-1. It must do this while observing normal G3 protocol rules, thus preventing G3 protocol timeouts from occurring at the destination FTE 10-2. The following technique is used to achieve this result:

The destination FIU 14-2 sends a made-up DCS frame to the FTE (FIG. 4, S4-3). The FIF field of this DCS frame is made to be compatible with the DIS signal previously received from the FTE.

After the made-up DCS and with appropriate G3 protocol timing and modem signaling, the destination FIU 14-2 sends to destination FTE 10-2 a bad TCF signal (FIG. 4, S4-4). The TCF signal is not composed of binary zero bits as per the G3 protocol, but is instead composed of alternating binary one and zero bits, thereby making it bad.

Since the TCF signal was constructed of an improper format, the destination FTE 10-2 interprets the TCF signal as badly-received and replies with an FTT frame instead of a CFR frame (FIG. 4, S4-5). The destination FTE 10-2 will therefore expect another DCS/TCF cycle and will not proceed to Phase C of the protocol where it would expect page data. This cycle of DCS/bad-TCF/FTT is repeated (FIG. 4, S4-6), with the FIU 14-2 observing proper G3 protocol timing and signaling, until the destination FIU 14-2 receives a DCS packet over the network 12 from originating FTE 10-1 (via originating FTU 14-1). The amount of time that the FTE can be kept in Phase B using this technique is indefinite.

When a DCS packet arrives over the network 12 (FIG. 4, S4-7), the destination FIU 14-2 continues the G3 protocol with the destination FTE 10-2 until it reaches a point where the destination FIU must send a DCS signal to the destination FTE. The destination FIU then sends the contents of the DCS packet received over the network 12 instead of the made-up DCS signal (FIG. 4, S4-8). Following the DCS, the destination FIU sends a good TCF in the proper format as specified by the G3 protocol and at the data rate specified in the DCS signal (FIG. 4, S4-9). Since the TCF has the proper format, the destination FTE 10-2 replies with a CFR frame (FIG. 4, S4-10).

The originating FIU 14-1 the starts the forwarding page data from the network 12 to the destination FTE. This page transmission process is described below.

After sending a page and the associated end-of-page signal, the originating FIU 14-1 receives the end-of-page acknowledgment from the FTE. If the end-of-page signal received over the network 12 is an MPS signal, the FIU then starts the page transmit process from the beginning. If the end-of-page signal is EOP, the originating FIU 14-1 then sends a DCN message to the FTE and the call is over.

Page Transmit Process at Destination FIU

The process whereby the destination FIU 14-2 transmits page data to the destination FTE 10-2 maintains a steady flow of valid scan line data to the FTE whether or not any data has been received over the network 12. (Recall that a scan line is a unit of coded page image data consisting of all image elements along a single horizontal line of the page.) During times of moderate delay, the process sends the data it has received over the network 12 but with additional fill as allowed by T.4, the purpose of the fill is to increase the amount of time it takes to transmit the scan line to the destination FTE 10-2. In the case of extremely long gaps in data received over the network 12, the process manufactures scan line data which has a valid format but which was not part of the original document. The insertion of this kind of made-up data is minimized by the process.

At the appropriate time in the G3 protocol, the destination FIU 14-2 must start transmitting page data to the destination FTE 10-2 with the appropriate G3 protocol timing and signaling. While the destination FIU is sending page data to the destination FTE, several conditions that must be handled, including:

1. The destination FIU 14-2 must start sending page data for a new page but no page data has arrived over the network 12 yet from the originating FIU 14-1. The destination FIU handles this situation by sending so-called stalling lines to the FTE. Stalling lines are valid scan lines manufactured by the destination FIU and transmitted to the destination FTE when no valid scan lines have been received from the network 12. A stalling line prints as a white scan line and is filled (see below) so that it requires a considerable amount of real-time to transmit to the destination FTE.

2. The destination FIU 14-2 is in the midst of sending page data but the flow of data from the originating FIU 14-1 is interrupted or unsteady before the page is complete. The FIU handles this situation either by sending stalling lines (described above) or by sending so-called filled lines to the destination FTE. Filled lines are scan lines received over the network 12 but modified by the destination FIU by adding additional zero bits after the end of valid data in the scan line but before the end of the scan line itself. Thus, the zero bits are inserted after the last non-EOL codeword of the scan line but before the EOL codeword that ends the scan line. Transmission of a filled line requires considerably more real time than would transmission of the same unfilled line, however, there is no change to the printed image of the scan line.

When the Destination FIU 14-2 begins transmitting a new page to the destination FTE, it will begin by sending stalling lines until some data has accumulated.

Stalling lines and filled lines provide extra time for data to arrive over the network 12 while still providing the destination FTE 10-2 with properly formatted scan lines on a real-time basis. Filled lines are used when the destination FIU 14-2 detects a slowdown in the arrival of data over the network 12 as an attempt to allow more received data to accumulate. When the accumulated data received from the network 12 has been exhausted due to unexpected delays, stalling lines are generated by the destination FIU to satisfy the destination FTE while more data from the network 12 accumulates.

Where possible, the destination FIU may start sending stalling lines before accumulated received data is actually exhausted if the destination FIU detects that an all-white scan line has been already received. In this case, the received white line will be printed followed by additional white lines due to stalling lines, resulting in a less-noticeable disruption to the printed image compared to stalling lines being inserted in non-white parts of the image.

Figure 5:
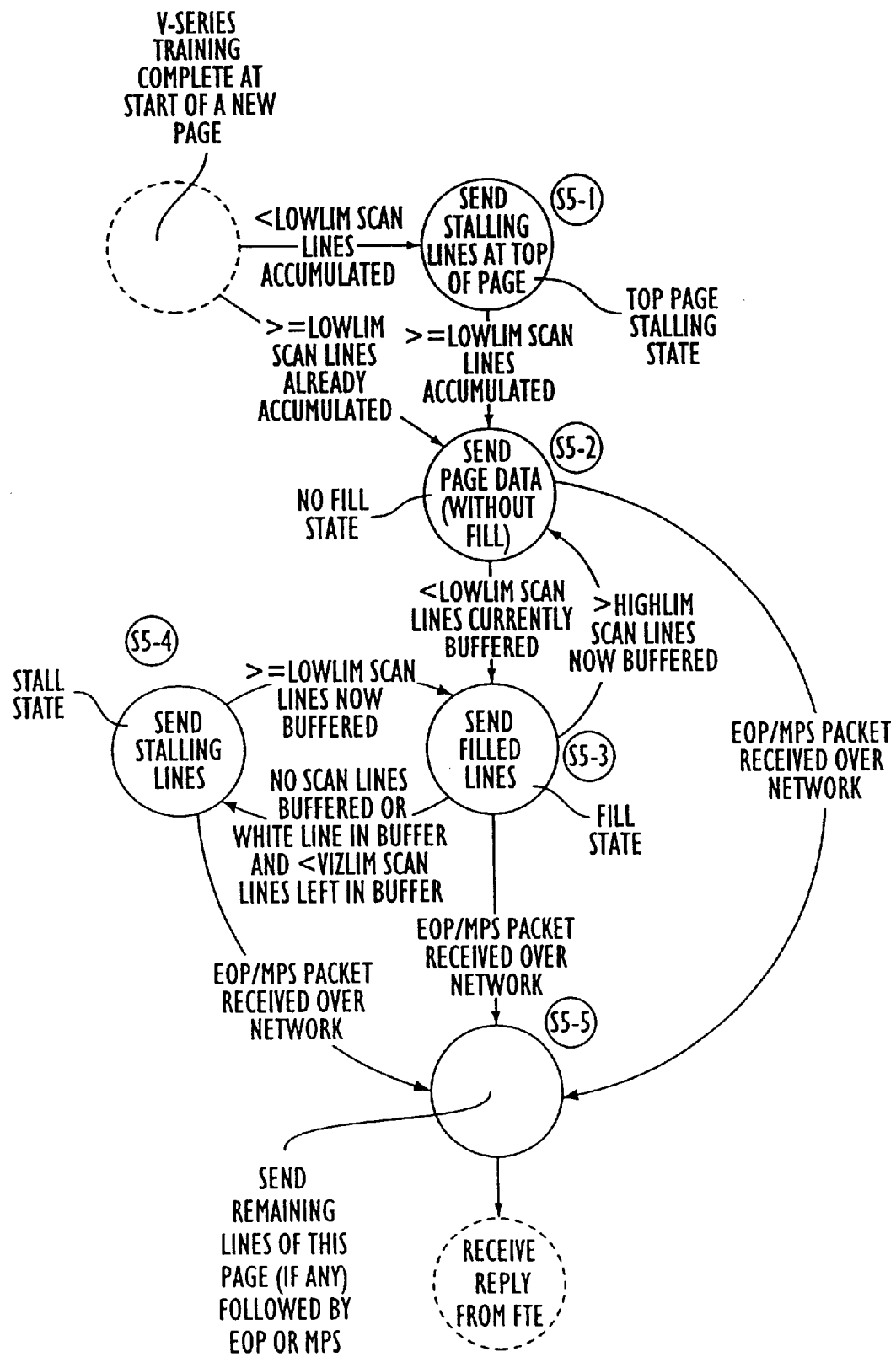
FIG. 5 shows the page data transmit states at the destination FIU using this invention.

The destination FIU 14-2 has four major states when transmitting page data to the destination FTE 10-2. These states are shown in FIG. 5 and are named (i) Top Page Stalling State, (ii) No Fill State, (iii) Fill State, and (iv) Stall State. The process for switching between these states smoothes out arrival of data from the network 12 and minimize disruption of the printed page image which can occur due to the insertion of stalling lines. The process uses a number of variables and constants including:

1. The number of complete, unprinted scan lines that have been received from the network 12, referred to here as CurLines;
2. A first constant, referred to here as LowLim;
3. A second constant, referred to here as HighLim; and
4. A third constant referred to here as VizLim.

The relationship between these three constants is:

$$0 < VizLim \leq LowLim < HighLim.$$

The selection of values for these constants is different for each application. Factors that affect the value selection include the amount of memory available for buffering of page data and the requirements for the maximum amount of time that an outage should persist without corruption of the printed page image.

With reference now to FIG. 5, when, according to the G3 protocol, the destination FIU 14-2 must begin sending page data to the destination FTE 10-2, the process is started. At this point, if CurLines is greater than or equal to LowLim, No Fill state is entered. Otherwise, Top Page Stalling state is entered.

The states and transitions shown in FIG. 5 are as follows:
Top Page Stalling State (FIG. 5, S5-1)
Activity: Send stalling lines to the FTE
Exit: Go to No Fill state when CurLines is greater than or equal to LowLim
No Fill State (FIG. 5, S5-2)
Activity: Send scan lines received over the network 12 to the FTE
Exit: Go to Fill state when CurLines is less than LowLim.
Fill State (FIG. 5, S5-3)
Activity: Send filled lines to the FTE
Exit: Go to No Fill state when CurLines is greater than HighLim. Go to Stall state when CurLines is zero.
Stall State (FIG. 5, S5-4)
Activity: Send stalling lines to the FTE
Exit: Go to Fill state when CurLines is greater than or equal to LowLim.

When the EOP or MPS packet is received over the network 12, the FIU proceeds to send all remaining, buffered scan lines to the FTE without additional fill (FIG. 5, S5-5).

The process is based on the number of scan lines received over the network 12 rather than simply the amount of data page data received over the network 12 because the delay techniques (that is, filled lines and stalling lines) are only executed on scan line boundaries. Knowing the amount of received data is irrelevant unless the location and number of scan lines within the data stream is also known.

Processing Unusual Conditions at the Destination FIU

Throughout the protocol, the destination FIU 14-2 follows the G3 protocol and its associated error handling. There are a number of special situations that may occur which require special, specific handling by the destination FIU 14-2.

Figure 6:
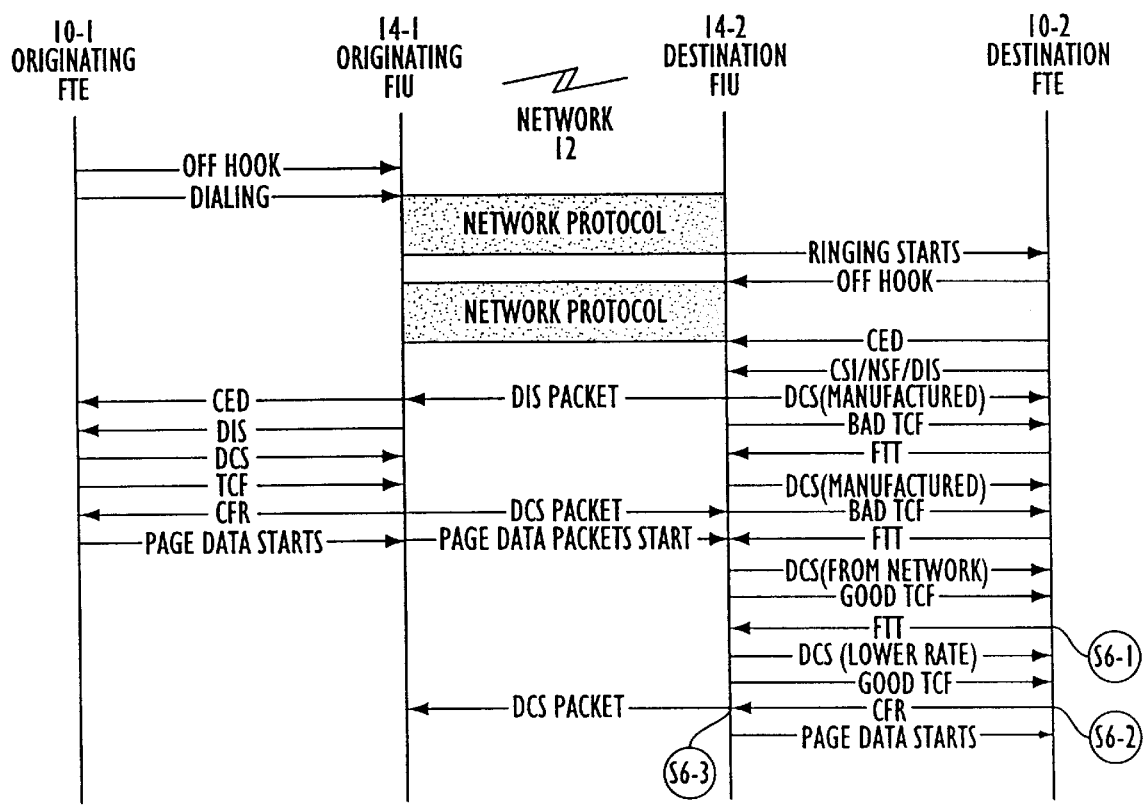
FIG. 6 shows a particular protocol situation at the destination end of the call where a different page transmit rate is negotiated compared to the originating end of the call.

It may happen that during the first completion of Phase B of the protocol, the FIU was not able to train the FTE at the page data rate specified in the DCS received over the network 12. In this case, the FTE replied to the TCF with FTT (FIG. 6, S6-1) and the FIU attempted training at lower rates, one of which was successful (FIG. 6, S6-2). When the FTE indicates successful training, the FIU sends a DCS packet over the network 12 (FIG. 6, S6-3) to notify the originating FIU 14-1 of the rate that was actually negotiated. For clarity, FIG. 6 only shows the start of a call.

Figure 7:
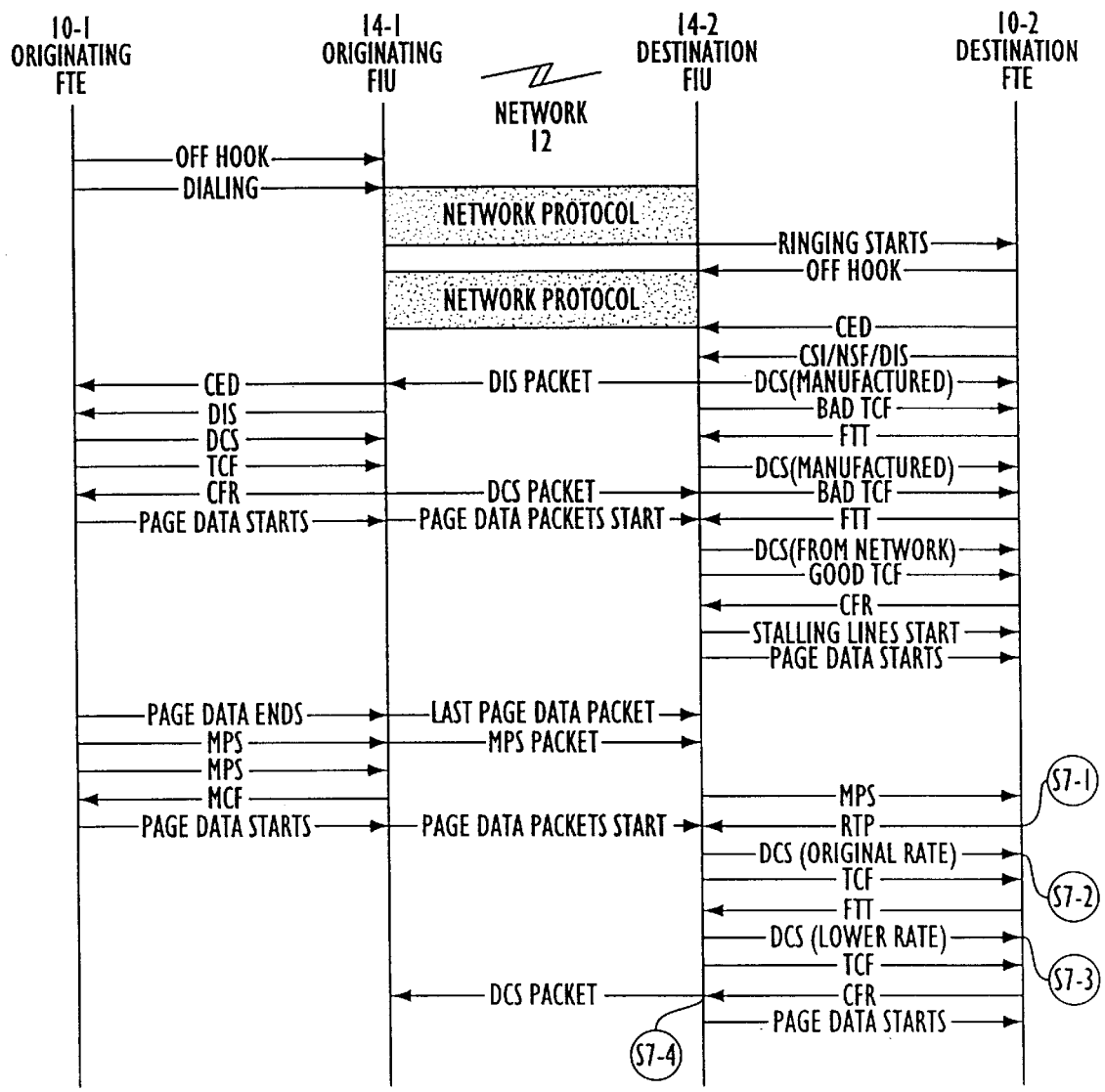
FIG. 7 shows a particular protocol situation at the destination end of the call where the FTE requests retraining.

If the destination FTE 10-2 replies to an MPS signal with RTP or RTN signal (FIG. 7, S7-1), the destination FIU 14-2 must return to Phase B of the protocol and retrain the destination FTE. The destination FIU starts the training procedure at the same rate as previously negotiated (FIG. 7, S7-2). If the destination FTE does not accept training at that rate (signified by replying to the TCF signal with FTT), the destination FIU tries progressively lower rates (FIG. 7, S7-3) until the destination FTE replies with CFR (FIG. 7, S7-4). The destination FIU then sends a DCS packet to the network 12 to indicate to the originating FIU 14-1 that a new rate has been negotiated.

If, for any reason, the end-to-end network 12 connection breaks before the EOP packet has been received, the FIU follows the G3 protocol to end the document transfer in a way that the FIU should report an incomplete document transfer.

Activity at the Originating End of the Call

The originating FIU 14-1 waits for arrival of the DIS packet over the network 12. When the DIS packet arrives (FIG. 4, S4-11), the originating FIU sends, to the originating FTE, the initial G3 protocol signals as if the originating FIU were simply another FTE itself. The standard G3 protocol Phase B proceeds (FIG. 4, S4-12) and the originating FIU eventually accepts training by answering CFR to the TCF signal (FIG. 4, S4-13). At this point, the originating FIU forwards a DCS packet containing the FIF of the most-recently received DCS frame from the destination FTE 10-2 over the network 12.

When the originating FTE starts transmitting page data, the originating FIU forwards this data over the network 12 as it is received from the FTE (FIG. 4, S4-14).

The originating FTE eventually stops transmitting page data and then transmits an appropriate end-of-page signal (FIG. 4, S4-15). In some preferred embodiments, if the end-of-page signal is an MPS, the FIU does not reply to the first MPS but waits until the FIU repeats the MPS signal. The FIU replies with MCF to the second MPS (FIG. 4, S4-16). Delaying the acknowledgment of the page in this way has the effect of allowing the destination FIU 14-2 and FTE to complete their end-of-page protocol in case there were any unexpected network 12 delays during page transmission. Note that it is a G3 protocol requirement that a device repeat the previous message in the event that there is no reply. This delayed acknowledgment is preferred in cases when the originating FTE or FIU believes that there is some network congestion.

The end-of-page signal for the last page of a document will be EOP instead of MPS. The FIU replies with MCF to the first EOP received (FIG. 4, S4-17). When the FIU transmits the DCN frame, the call is over.

Special Techniques for Error Correction Mode

Error Correction Mode (ECM) is an optional method of sending page data that can result in a mistake-free printed page. In ECM, the page data is broken up into smaller chunks known as packets or frames. These packets are numbered in sequence and protected with an error check sequence so that the receiver can know whether the packet was received correctly.

There are two ways for handling a call using ECM as described in the following paragraphs.

In the first method, the originating FIU 14-1 de-frames the ECM data from the originating FTE 10-1 and sends it over the network 12 as ordinary non-ECM data. The destination FIU 14-2 follows all previously described processes, including those for stalling and filling, but packages all page data sent to the FTE in ECM frames. To handle a request for retransmission from the destination FTE 10-2, the destination FIU 14-2 must keep a copy of all frames sent to the destination FTE 10-2 until they are acknowledged by the destination FTE 10-2.

In the second method, the originating FIU 14-1 forwards ECM frames over the network 12 exactly as they were received from the originating FTE 10-1. The destination FIU 14-2 changes its stalling and filling processes so that they are based on the number of complete, untransmitted (to the destination FTE 10-2) ECM frames received over the network 12. The destination FIU 14-2 does not look at the scan line data within the frames and does not know where scan line boundaries are.

The previous definition of filled lines is changed in the case of ECM to mean that additional flags are transmitted between ECM frames. The previous definition of "stalling lines" is changed in the case of ECM to mean that ECM frames containing nonsense data and with an intentionally bad FCS are transmitted to the destination FTE 10-2 if there are no buffered ECM frames available in the destination FIU 14-2. Since the frames have a bad FCS, they will be ignored by the destination FTE 10-2 but they will prevent timeouts due to lack of received data at the destination FTE 10-2.

The definitions of the constants LowLim and HighLim given above are changed to refer to the number of buffered (but not yet transmitted to the destination FTE 10-2) ECM frames. The constant VizLim is not used in the method of handling ECM since the FIU will not intentionally corrupt the printed page image.

Thus, in the Send filled lines state of FIG. 5 (reference number S5-3), a long sequence of flags is generated by the destination FIU 14-2 after each ECM frame that it sends to the destination FTE 10-2. This effectively extends the amount of time it takes to send each ECM frame. Similarly, in the Send stalling lines state of FIG. 5 (reference number S5-4), ECM frames are sent to the destination FIU 14-2 but they contain nonsense data and are terminated with a bad FCS.

As noted above, each FTE is a G3 facsimile device. As such, each FTE can be a stand-alone facsimile machine, a general or special purpose computer (e.g., a PC and the like) or any other device incorporating a processor running a G3 facsimile machine. Further, this invention can be implemented in software, hardware or any combination thereof. The invention can be on a dedicated machine, and ASIC and the like. When implemented fully or partially in software, the invention can reside on any memory or storage medium, including but not limited to a ROM, a disk, an ASIC, a PROM and the like.

Thus, real-time facsimile transmission over digital networks is provided. One skilled in the art will appreciate that the present invention can be practiced by other than the described embodiments, which are presented for purposes of illustration and not limitation, and the present invention is limited only by the claims that follow.

What is claimed:

1. In a system wherein an originating facsimile terminal equipment (FTE) which operates according to the G3 protocol connects to an intermediate digital network of unknown and unpredictable delay via an originating facsimile interface unit (FIU) and wherein a destination FTE which operates according to the G3 protocol and connects to the network via a destination FIU, a method of providing facsimile communications comprising:

(a) the originating FTE sending data to the destination FTE via the originating FIU and the destination FIU;

(b) the originating FIU sending the data to the destination FIU;

(c) while the destination FIU is waiting for data from the originating FTE, the destination FIU sending a made-up data to the destination FTE to prevent protocol timeouts of the destination FTE, wherein the destination FIU sends made-up data to the destination FTE until the destination FIU has accumulated some data from the originating FTE;

(d) the originating FTE, at the end of sending a page of data, sending an end-of-page signal to the destination FTE via the originating FIU;

(e) the originating FIU delaying acknowledgment to the originating FTE of the end-of-page signal; and (f) in response to the delayed acknowledgment, the originating FTE sending an another end-of-page signal to the destination FTE via the originating FIU, thereby allowing the destination FIU and the destination FTE to complete their end-of-page protocol, wherein:

(i) the data being sent by the originating FTE is scan-line data of a document being sent, and wherein the made-up data comprises data which has a valid format and which was not part of the original document, (ii) the destination FIU sends the made-up data to the destination FTE when the destination FIU has not received a scan line from the originating FIU, and wherein the made-up data comprises a valid scan line, (iii) the destination FIU sends the made-up data to the destination FTE when the destination FIU has received at least some of a scan line from the originating FIU, (iv) the made-up data comprises some of the received scan line and additional data, (v) the kind of made-up data sent to the destination FTE depends on the number of complete, unprinted scan lines that have been received by the destination FIU over the network; and (vi) the sending made-up data comprises:

(1) when the destination FIU detects a slowdown in the arrival of data over the network, sending filled lines to the destination FTE, and (2) when the destination FIU detects unexpected delays in the arrival of data, sending stalling lines to the destination FTE.

2. In a system wherein an originating facsimile terminal equipment (FTE) connects to an intermediate digital network via an originating facsimile interface unit (FIU) and wherein a destination FTE connects to the network via a destination FIU, a method of providing facsimile communications comprising:

the originating FTE sending data to the destination FTE via the originating FIU and the destination FIU;

the originating FIU sending the data to the destination FIU; and while the destination FIU is waiting for data from the originating FTE, the destination FIU sending made-up data to the destination FTE to prevent protocol timeouts of the destination FTE, wherein the data being sent by the originating FTE is scan-line data of a document being sent, and wherein the made-up data comprises data which has a valid format and which was not part of the original document, the destination FIU sends the made-up data to the destination FTE when the destination FIU has not received a scan line from the originating FIU, and wherein the made-up data comprises a valid scan line, and the destination FIU sends made-up data to the destination FTE until the destination FIU receives an all-white scan line, the method further comprising, when the destination FIU receives an all-white scan line, sending to the destination FTE additional white scan lines.

3. In a system wherein an originating facsimile terminal equipment (FTE) connects to an intermediate digital network via an originating facsimile interface unit (FIU) and wherein a destination FTE connects to the network via a destination FIU, a method of providing facsimile communications comprising:

the originating FTE sending data to the destination FTE via the originating FIU and the destination FIU; and the originating FIU sending the data to the destination FIU; and while the destination FIU is waiting for data from the originating FTE, the destination FIU sending made-up data to the destination FTE to prevent protocol timeouts of the destination FTE, wherein the data being sent by the originating FTE is scan-line data of a document being sent, and wherein the made-up data comprises data which has a valid format and which was not part of the original document, and the destination FIU sends the made-up data to the destination FTE when the destination FIU has received at least some of a scan line from the originating FIU, and wherein the made-up data comprises some of the received scan line and additional data.

4. In a system wherein an originating facsimile terminal equipment (FTE) connects to an intermediate digital network via an originating facsimile interface unit (FIU) and wherein a destination FTE connects to the network via a destination FIU, a method of providing facsimile communications comprising:

the originating FTE sending data to the destination FTE via the originating FIU and the destination FIU;

the originating FIU sending the data to the destination FIU; and while the destination FIU is waiting for data from the originating FTE, the destination FIU sending made-up data to the destination FTE to prevent protocol timeouts of the destination FTE, wherein the data being sent by the originating FTE is scan-line data of a document being sent, and wherein the made-up data comprises data which has a valid format and which was not part of the original document, and the kind of made-up data sent to the destination FTE depends on the number of complete, unprinted scan lines that have been received by the destination FIU over the network.

5. A method as in claim 4 wherein the sending made-up data comprises:

(a) when the destination FIU detects a slowdown in the arrival of data over the network, sending filled lines to the destination FTE, and (b) when the destination FIU detects unexpected delays in the arrival of data, sending stalling lines to the destination FTE.

6. In a system wherein an originating facsimile terminal equipment (FTE) connects to an intermediate digital network via an originating facsimile interface unit (FIU) and wherein a destination FTE connects to the network via a destination FIU, a method of providing facsimile communications comprising:

the originating FTE sending data to the destination FTE via the originating FIU and the destination FIU;

the originating FIU sending the data to the destination FIU;

while the destination FIU is waiting for data from the originating FTE, the destination FIU sending made-up data to the destination FTE to prevent protocol timeouts of the destination FTE;

the originating FTE, at the end of sending a page of data, sending an end-of-page signal to the destination FTE via the originating FIU;

the originating FIU delaying acknowledgment to the originating FTE of the end-of-page signal; and in response to the delayed acknowledgment, the originating FTE sending an another end-of-page signal to the destination FTE via the originating FIU, thereby allowing the destination FIU and the destination FTE to complete their end-of-page protocol, wherein the data being sent by the originating FTE is scan-line data of a document being sent, and wherein the made-up data comprises data which has a valid format and which was not part of the original document.

7. In a system wherein an originating facsimile terminal equipment (FTE) connects to an intermediate digital network via an originating facsimile interface unit (FIU) and wherein a destination FTE connects to the network via a destination FIU, a method of providing facsimile communications comprising:

the originating FTE sending data to the destination FTE via the originating FIU and the destination FIU;

the originating FIU sending the data to the destination FIU; and while the destination FIU is waiting for data from the originating FTE, the destination FIU sending made-up data to the destination FTE to prevent protocol timeouts of the destination FTE; and in an error correcting mode (ECM) in which page data is broken up into frames, the destination FIU:

packaging into frames all page data sent to be sent to the destination FTE;

sending all page data to the destination FTE as the packaged frames;

keeping a copy of each packaged frame sent to the destination FTE; and in response to a request from the destination FTE for retransmission of a frame, sending a copy of the requested frame, wherein the data being sent by the originating FTE is scan-line data of a document being sent, and wherein the made-up data comprises data which has a valid format and which was not part of the original document.

8. A method as in claim 7 wherein the destination FIU keeps a copy of each packaged frame sent to the destination FTE until the frame is acknowledged by the destination FTE.

9. In a system wherein an originating facsimile terminal equipment (FTE) connects to an intermediate digital network via an originating facsimile interface unit (FIU) and wherein a destination FTE connects to the network via a destination FIU, a method of receiving a facsimile communication comprising, by the destination FIU:

receiving data from the originating FTE; and while waiting for data from the originating FTE, sending made-up data to the destination FTE to prevent protocol timeouts of the destination FTE, wherein the data being sent by the originating FTE is scan-line data of a document being sent, and wherein the made-up data comprises data which has a valid format and which was not part of the original document, the destination FIU sends the made-up data to the destination FTE when the destination FIU has not received a scan line from the originating FIU, and wherein the made-up data comprises a valid scan line, and the destination FIU sends made-up data to the destination FTE until the destination FIU receives an all-white scan line, the method further comprising, when the destination FIU receives an all-white scan line, sending to the destination FTE additional white scan lines.

10. In a system wherein an originating facsimile terminal equipment (FTE) connects to an intermediate digital network via an originating facsimile interface unit (FIU) and wherein a destination FTE connects to the network via a destination FIU, a method of receiving a facsimile communication comprising, by the destination FIU:

receiving data from the originating FTE; and while waiting for data from the originating FTE, sending made-up data to the destination FTE to prevent protocol timeouts of the destination FTE, wherein the data being sent by the originating FTE is scan-line data of a document being sent, and wherein the made-up data comprises data which has a valid format and which was not part of the original document, and the destination FIU sends the made-up data to the destination FTE when the destination FIU has received at least some of a scan line from the originating FIU, and wherein the made-up data comprises some of the received scan line and additional data.

11. In a system wherein an originating facsimile terminal equipment (FTE) connects to an intermediate digital network via an originating facsimile interface unit (FIU) and wherein a destination FTE connects to the network via a destination FIU, a method of receiving a facsimile communication comprising, by the destination FIU:

receiving data from the originating FTE; and while waiting for data from the originating FTE, sending made-up data to the destination FTE to prevent protocol timeouts of the destination FTE, wherein the data being sent by the originating FTE is scan-line data of a document being sent, and wherein the made-up data comprises data which has a valid format and which was not part of the original document, and the kind of made-up data sent to the destination FTE depends on the number of complete, unprinted scan lines that have been received by the destination FIU over the network.

12. A method as in claim 11 wherein the sending made-up data comprises:

(a) when the destination FIU detects a slowdown in the arrival of data over the network, sending filled lines to the destination FTE, and (b) when the destination FIU detects unexpected delays in the arrival of data, sending stalling lines to the destination FTE.

13. A method of receiving a facsimile communication at a destination facsimile terminal equipment (FTE) from an originating (FTE) via an intermediate digital network, wherein the destination FTE connects to the network via a destination FIU, the method comprising, by the destination FIU:

receiving data from the originating FTE; and while waiting for data from the originating FTE, sending made-up data to the destination FTE to prevent protocol timeouts of the destination FTE, wherein the data being sent by the originating FTE is scan-line data of a document being sent, and wherein the made-up data comprises data which has a valid format and which was not part of the original document, and the destination FIU sends made-up data to the destination FTE until the destination FIU receives an all-white scan line, the method further comprising, when the destination FIU receives an all-white scan line, sending to the destination FTE additional white scan lines.

14. A method of receiving a facsimile communication at a destination facsimile terminal equipment (FTE) from an originating (FTE) via an intermediate digital network, wherein the destination FTE connects to the network via a destination FIU, the method comprising, by the destination FIU:

receiving data from the originating FTE; and while waiting for data from the originating FTE, sending made-up data to the destination FTE to prevent protocol timeouts of the destination FTE, wherein the data being sent by the originating FTE is scan-line data of a document being sent, and wherein the made-up data comprises data which has a valid format and which was not part of the original document, the destination FIU sends the made-up data to the destination FTE when the destination FIU has not received a scan line from the originating FIU, and wherein the made-up data comprises a valid scan line, and the destination FIU sends the made-up data to the destination FTE when the destination FIU has received at least some of a scan line from the originating FIU, and wherein the made-up data comprises some of the received scan line and additional data.

15. A method of receiving a facsimile communication at a destination facsimile terminal equipment (FTE) from an originating (FTE) via an intermediate digital network, wherein the destination FTE connects to the network via a destination FIU, the method comprising, by the destination FIU:

receiving data from the originating FTE; and while waiting for data from the originating FTE, sending made-up data to the destination FTE to prevent protocol timeouts of the destination FTE, wherein the data being sent by the originating FTE is scan-line data of a document being sent, and wherein the made-up data comprises data which has a valid format and which was not part of the original document, the destination FIU sends made-up data to the destination FTE until the destination FIU has accumulated some data from the originating FTE, and the kind of made-up data sent to the destination FTE depends on the number of complete, unprinted scan lines that have been received by the destination FIU over the network.

16. A method of receiving a facsimile communication at a destination facsimile terminal equipment (FTE) from an originating (FTE) via an intermediate digital network, wherein the destination FTE connects to the network via a destination FIU, the method comprising, by the destination FIU:

receiving data from the originating FTE; and while waiting for data from the originating FTE, sending made-up data to the destination FTE to prevent protocol timeouts of the destination FTE, wherein the data being sent by the originating FTE is scan-line data of a document being sent, and wherein the made-up data comprises data which has a valid format and which was not part of the original document, the destination FIU sends the made-up data to the destination FTE when the destination FIU has not received a scan line from the originating FIU, and wherein the made-up data comprises a valid scan line, and the sending made-up data comprises:

when the destination FIU detects a slowdown in the arrival of data over the network, sending filled lines to the destination FTE, and when the destination FIU detects unexpected delays in the arrival of data, sending stalling lines to the destination FTE.

17. In a system wherein an originating facsimile terminal equipment (FTE) connects to an intermediate digital network via an originating facsimile interface unit (FIU) and wherein a destination FTE connects to the network via a destination FIU, an FIU programmed to perform:

while the FIU is waiting for data from an originating FTE, the FIU sending made-up data to a destination FTE to prevent protocol timeouts of the destination FTE, wherein the data being sent by the originating FTE is scan-line data of a document being sent, and wherein the made-up data comprises data which has a valid format and which was not part of the original document, the FIU is programmed to send the made-up data to the destination FTE when the destination FIU has not received a scan line from the originating FIU, and wherein the made-up data comprises a valid scan line, the destination FIU sends made-up data to the destination FTE until the destination FIU has accumulated some data from the originating FTE, and the FIU is further programmed to send made-up data to the destination FTE until the destination FIU receives an all-white scan line, the method further comprising, when the destination FIU receives an all-white scan line, sending to the destination FTE additional white scan lines.

18. In a system wherein an originating facsimile terminal equipment (FTE) connects to an intermediate digital network via an originating facsimile interface unit (FIU) and wherein a destination FTE connects to the network via a destination FIU, an FIU programmed to perform:

while the FIU is waiting for data from an originating FTE, the FIU sending made-up data to a destination FTE to prevent protocol timeouts of the destination FTE, wherein the data being sent by the originating FTE is scan-line data of a document being sent, and wherein the made-up data comprises data which has a valid format and which was not part of the original document, and the FIU is programmed to send the made-up data to the destination FTE, when the destination FIU has received at least some of a scan line from the originating FIU, and wherein the made-up data comprises some of the received scan line and additional data.

19. In a system wherein an originating facsimile terminal equipment (FTE) connects to an intermediate digital network via an originating facsimile interface unit (FIU) and wherein a destination FTE connects to the network via a destination FIU, an FIU programmed to perform:

while the FIU is waiting for data from an originating FTE, the FIU sending made-up data to a destination FTE to prevent protocol timeouts of the destination FTE, wherein the data being sent by the originating FTE is scan-line data of a document being sent, and wherein the made-up data comprises data which has a valid format and which was not part of the original document, and the kind of made-up data sent to the destination FTE depends on the number of complete, unprinted scan lines that have been received by the destination FIU over the network.

20. An FIU as in claim 19 wherein the sending made-up data comprises:

(a) when the destination FIU detects a slowdown in the arrival of data over the network, sending filled lines to the destination FTE, and (b) when the destination FIU detects unexpected delays in the arrival of data, sending stalling lines to the destination FTE.

21. In a system wherein an originating facsimile terminal equipment (FTE) connects to an intermediate digital network of unknown and unpredictable delay via an originating facsimile interface unit (FIU) and wherein a destination FTE connects to the network via a destination FIU, wherein the originating and the destination facsimile terminal equipment operates according to the G3 protocol, a memory medium comprising software programmed to provide facsimile communications by:

(a) the originating FTE sending data to the destination FTE via the originating FIU and the destination FIU;

(b) the originating FIU sending the data to the destination FIU;

(c) while the destination FIU is waiting for data from the originating FTE, the destination FIU sending made-up data to the destination FTE to prevent protocol timeouts of the destination FTE;

(d) the originating FTE, at the end of sending a page of data, sending an end-of-page signal to the destination FTE via the originating FIU;

(e) the originating FIU delaying acknowledgment to the originating FTE of the end-of-page signal; and (f) in response to the delayed acknowledgment, the originating FTE sending an another end-of-page signal to the destination FTE via the originating FIU, thereby allowing the destination FIU and the destination FTE to complete their end-of-page protocol, and, in an error correcting mode (ECM) in which page data is broken up into frames, (g) packaging into frames all page data sent to be sent to the destination FTE;

(h) sending all page data to the destination FTE as the packaged frames;

(i) keeping a copy of each packaged frame sent to the destination FTE; and (j) in response to a request from the destination FTE for retransmission of a frame, sending a copy of the requested frame, wherein the data being sent by the originating FTE is scan-line data of a document being sent, and wherein the made-up data comprises data which has a valid format and which was not part of the original document, and wherein the software is further programmed such that the destination FIU sends the made-up data to the destination FTE when the destination FIU has not received a scan line from the originating FIU, and wherein the made-up data comprises a valid scan line, and wherein the software is further programmed such that the destination FIU sends made-up data to the destination FTE until the destination FIU has accumulated some data from the originating FTE, wherein the software is further programmed such that the destination FIU sends made-up data to the destination FTE until the destination FIU receives an all-white scan line, the memory medium further comprising, when the destination FIU receives an all-white scan line, sending to the destination FTE additional white scan lines, and wherein the kind of made-up data sent to the destination FTE depends on the number of complete, unprinted scan lines that have been received by the destination FIU over the network, and wherein the sending of made-up data comprises:
(a) when the destination FIU detects a slowdown in the arrival of data over the network, sending filled lines to the destination FTE, and
(b) when the destination FIU detects unexpected delays in the arrival of data, sending stalling lines to the destination FTE.

22. In a system wherein an originating facsimile terminal equipment (FTE) connects to an intermediate digital network via an originating facsimile interface unit (FIU) and wherein a destination FTE connects to the network via a destination FIU, a memory medium comprising software programmed to provide facsimile communications by:
the originating FTE sending data to the destination FTE via the originating FIU and the destination FIU;
the originating FIU sending the data to the destination FIU; and
while the destination FIU is waiting for data from the originating FTE, the destination FIU sending made-up data to the destination FTE to prevent protocol timeouts of the destination FTE, wherein
the data being sent by the originating FTE is scan-line data of a document being sent, and wherein the made-up data comprises data which has a valid format and which was not part of the original document,
the software is further programmed such that the destination FIU sends the made-up data to the destination FTE when the destination FIU has not received a scan line from the originating FIU, and wherein the made-up data comprises a valid scan line, and
the software is further programmed such that the destination FIU sends made-up data to the destination FIU until the destination FIU receives an all-white scan line, the memory medium further comprising, when the destination FIU receives an all-white scan line, sending to the destination FTE additional white scan lines.

23. In a system wherein an originating facsimile terminal equipment (FTE) connects to an intermediate digital network via an originating facsimile interface unit (FIU) and wherein a destination FTE connects to the network via a destination FIU, a memory medium comprising software programmed to provide facsimile communications by:
the originating FTE sending data to the destination FTE via the originating FIU and the destination FIU;
the originating FIU sending the data to the destination FIU; and
while the destination FIU is waiting for data from the originating FTE, the destination FIU sending made-up data to the destination FTE to prevent protocol timeouts of the destination FTE, wherein
the data being sent by the originating FTE is scan-line data of a document being sent, and wherein the made-up data comprises data which has a valid format and which was not part of the original document, and
the software is further programmed such that the destination FIU sends the made-up data to the destination FTE when the destination FIU has received at least some of a scan line from the originating FIU, and wherein the made-up data comprises some of the received scan line and additional data.

24. In a system wherein an originating facsimile terminal equipment (FTE) connects to an intermediate digital network via an originating facsimile interface unit (FIU) and wherein a destination FTE connects to the network via a destination FIU, a memory medium comprising software programmed to provide facsimile communications by:
the originating FTE sending data to the destination FTE via the originating FIU and the destination FIU;
the originating FIU sending the data to the destination FIU; and
while the destination FIU is waiting for data from the originating FTE, the destination FIU sending made-up data to the destination FTE to prevent protocol timeouts of the destination FTE, wherein
the data being sent by the originating FTE is scan-line data of a document being sent, and wherein the made-up data comprises data which has a valid format and which was not part of the original document, and
the kind of made-up data sent to the destination FTE depends on the number of complete, unprinted scan lines that have been received by the destination FIU over the network.

25. A memory medium as in claim 24 wherein the sending of made-up data comprises:
(a) when the destination FIU detects a slowdown in the arrival of data over the network, sending filled lines to the destination FTE, and
(b) when the destination FIU detects unexpected delays in the arrival of data, sending stalling lines to the destination FTE.

26. In a system wherein an originating facsimile terminal equipment (FTE) connects to an intermediate digital network via an originating facsimile interface unit (FIU) and wherein a destination FTE connects to the network via a destination FIU, a memory medium comprising software programmed to provide facsimile communications by:
the originating FTE sending data to the destination FTE via the originating FIU and the destination FIU;
the originating FIU sending the data to the destination FIU; and
while the destination FIU is waiting for data from the originating FTE, the destination FIU sending made-up data to the destination FTE to prevent protocol timeouts of the destination FTE, wherein
the data being sent by the originating FTE is scan-line data of a document being sent, and wherein the made-up data comprises data which has a valid format and which was not part of the original document, and
the software is further programmed to provide facsimile communications by:
the originating FTE, at the end of sending a page of data, sending an end-of-page signal to the destination FTE via the originating FIU;
the originating FIU delaying acknowledgment to the originating FTE of the end-of-page signal; and
in response to the delayed acknowledgment, the originating FTE sending an another end-of-page signal to the destination FTE via the originating FIU, thereby allowing the destination FIU and the destination FTE to complete their end-of-page protocol.

27. In a system wherein an originating facsimile terminal equipment (FTE) connects to an intermediate digital network via an originating facsimile interface unit (FIU) and wherein a destination FTE connects to the network via a destination FIU, a memory medium comprising software programmed to provide facsimile communications by:
the originating FTE sending data to the destination FTE via the originating FIU and the destination FIU;
the originating FIU sending the data to the destination FIU; and while the destination FIU is waiting for data from the originating FTE, the destination FIU sending made-up data to the destination FTE to prevent protocol timeouts of the destination FTE, wherein the data being sent by the originating FTE is scan-line data of a document being sent, and wherein the made-up data comprises data which has a valid format and which was not part of the original document, and the software is further programmed to provide facsimile communications by, in an error correcting mode (ECM) in which page data is broken up into frames,
packaging into frames all page data sent to be sent to the destination FTE;
sending all page data to the destination FTE as the packaged frames;
keeping a copy of each packaged frame sent to the destination FTE; and
in response to a request from the destination FTE for retransmission of a frame, sending a copy of the requested frame.

28. A memory medium as in claim 27 wherein the destination FIU keeps a copy of each packaged frame sent to the destination FTE until the frame is acknowledged by the destination FTE.

* * * * *